United States Patent [19]
Godfrey

[11] B 3,914,410
[45] Oct. 21, 1975

[54] METHOD FOR PREPARING SUCROSE COMPOSITION CONTAINING CHROMIUM III SALT

[75] Inventor: John Carl Godfrey, Syracuse, N.Y.

[73] Assignee: Bristol-Myers Company, New York, N.Y.

[22] Filed: June 13, 1972

[21] Appl. No.: 262,378

[44] Published under the Trial Voluntary Protest Program on January 28, 1975 as document no. B 262,378.

[52] U.S. Cl. .................... 424/131; 127/29; 127/30; 127/63; 426/218
[51] Int. Cl.² ..................... A23L 1/30; A61K 33/00
[58] Field of Search .................. 127/30, 29, 63, 42; 424/131, 137, 127, 131; 426/74, 218

[56] References Cited
OTHER PUBLICATIONS
Henry A. Schroeder, J. Nutr. 97(2), 237–242, (1969).
Chemical Abstracts, 70:18262s, (1969).
Chemical Abstracts, 70:26758y, (1969).

*Primary Examiner*—Morris O. Wolk
*Assistant Examiner*—Sidney Marantz
*Attorney, Agent, or Firm*—Herbert W. Taylor, Jr.

[57] ABSTRACT

Trace amounts of chromium III salts (e.g., 0.5 to 5.0 p.p.m. of chromium III ion by weight) are added to refined (white) sucrose and to glucose to produce a nontoxic, fortified sugar composition having the property of reducing the severity or incidence of atherosclerosis or adult onset diabetes.

7 Claims, No Drawings

METHOD FOR PREPARING SUCROSE COMPOSITION CONTAINING CHROMIUM III SALT

BACKGROUND OF THE INVENTION

1. Field of the Invention

The present invention is in the field of food additives and methods for thereby reducing the incidence of certain diseases.

2. Description of the Prior Art

It is a surprising, recent discovery that a minute trace of the trivalent chromium ion, also known as chromium III, $Cr^{III}$, Cr III, and $Cr^{+++}$, is an essential micronutrient for humans and for animals.[1-9] Footnotes refer to references given in the Bibliography of this specification. The reason for this is that, as has also recently been demonstrated, $Cr^{+++}$ is an essential co-factor for the action, both in vitro and in vivo, of the hormone insulin.[3] Further more, it has been demonstrated that the usual diet of refined foods in many technologically advanced countries, such as the United States, Great Britain, and Western Europe, is seriously deficient in trace element chromium.[1] A major contributing factor to the low chromium content of daily diets in these and other technologically advanced areas of the world is the use of large amounts of the highly refined sugar, sucrose, which, in its highly refined state, contains virtually no chromium at all.[1] This circumstance is a natural result of well-intended attempts during the last 300 years to improve the quality of sugar by refining techniques which now involve many steps and result in the preparation of what is believed by many authorities to be the most pure chemical, sucrose, ever to be produced on a large scale. Table sugar, sucrose, the common article of commerce, is for all practical purposes absolutely pure. The sucrose molecule, $C_{12}H_{22}O_{11}$, is a disaccharide composed of equal parts of the monosaccharides D-glucose and D-fructose and has structure I.[10]

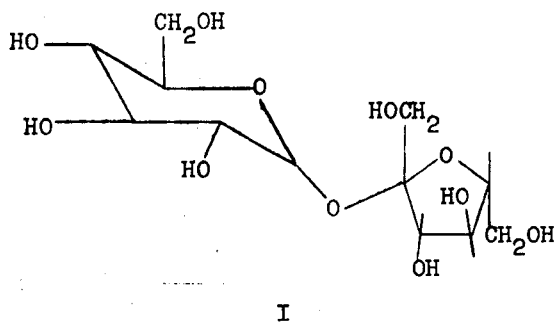

I

In the digestive system of the mammal, sucrose is split by the action of stomach acid[10] or by the enzymes sucrase[11] or invertase[10] to the component monosaccharides D-glucose and D-fructose, structures II and IIIa, IIIb respectively.

IIIa, IIIb is a mixture of two structures which exist in equilibrium in aqueous solution and is known as a tautomeric mixture. Structures IIIa and IIIb therefore represent the same compound, D-fructose, in its furanose (IIIa) and pyranose (IIIb) forms.

It is known that simple monosaccharides, including D-glucose and D-fructose, are readily and almost completely absorbed from the alimentary tract into the blood stream in mammals.[11] D-Glucose is rapidly and completely metabolized in the body of healthy mammals to provide energy for life processes, and its metabolism is carried out by a complex system of enzymes. One of the body's hormones, insulin, is essential in the control of this metabolic process. It is for example well known that individuals who secrete little or none of this hormone in its active form exhibit the symptoms which characterize the ubiquitous and well-known disease, *diabetes mellitus*. It is also well-known among medical practitioners that individuals who suffer from diabetes mellitus experience an extremely high rate of cardiovascular disease and very frequently die of heart attack and stroke.[1] It is in addition now clear that human atherosclerosis is most often associated with abnormalities of glucose metabolism, intolerance to glucose being frequently found.[1, 12-15]

Additional recent studies have demonstrated that during a condition of glucose load in a mammal, whether it be from orally ingested glucose or sucrose or from intravenously administered glucose, the feedback mechanisms which are responsible for the body's homeostasis call forth the hormone insulin to regulate the metabolism of the glucose.[16] It has further been recently demonstrated that conincident with the rise in insulin blood-levels in healthy individuals there is a highly significant rise in the blood level of the insulin co-factor chromium III.[16] During the period of glucose metabolism, which may extend over two or more hours in the human, the chromium which has been brought forth from its body stores is excreted in the urine to an appreciable extent, which has been estimated to be up to about 30% of the mobilized chromium III.[17,18] By contrast, in diabetic individuals who receive a glucose load, the rise in blood level of chromium III is usually either very modest or not seen.[18] Moreover, during periods of oral supplementation of humans with minute amounts of chromium III, those who have impaired glucose tolerances characteristic of diabetic or pre-diabetic individuals excrete in their urine more chromium than normal individuals, under the influence of a glucose load.[19]

The following conclusions are therefore apparent:

1. Human and some other mammalian diets are deficient in essential traces of chromium III.

2. The large sucrose intake of modern man requires that he have adequate chromium III intake to supply

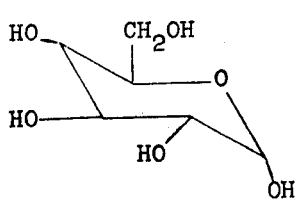

II

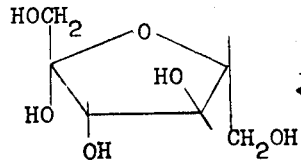

IIIa

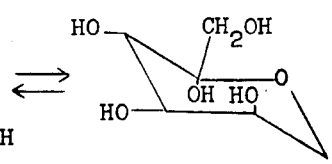

IIIb that amount necessary as a co-factor for the action of insulin in the metabolism of glucose.

3. In the absence of an adequate dietary intake of chromium III, a significant proportion of the human population becomes diabetic and many persons who do not develop overt diabetes do become victims of cardiovascular diseases.[17]

The ordinary sucrose most heavily laden with chromium reported by Schroeder is "Domino Brown," with 0.54 μg chromium III ion per gram of sucrose.

$$0.54/1,000,000 = 0.54 \text{ ppm.}$$

His reported "Brown No. 4" had from 0.76 to 1.1 ppm of Cr, but its brand name is uncertain.

"Refined" white sugars contain from zero to 0.11 ppm (cane), or 0.15 to 0.30 ppm (beet) and are referred to herein as "refined sucrose."

For a review of sugar technology see R.A. McGinnis in Kirk-Othmer, *Encyclopedia of Chemical Technology*, Second completelyl revised edition, Vol. 19, John Wiley and Sons, "Sugar," pp. 151–220, 1969.

SUMMARY OF THE INVENTION

What I have invented is supplementation of the diets of humans and animals with minute amounts of chromium III salts added to sucrose or glucose to reduce or prevent the sequellae of chromium III deficiency, particularly atheroschlerosis and/or adult onset diabetes.

One of my ways to introduce essential traces of chromium III into the diet is by way of the addition of such salts to sucrose during the final stages of its purification. This is highly practical because it is known that unrefined sugar contains appreciable quantities of chromium which are removed during refining, and the co-presence of sucrose and chromium III in the digestive system is highly desirable, as is apparent from the preceding discussion.

Various embodiments of my invention include the following:

1. A physical mixture of refined sucrose and a pharmacologically acceptable chromium III salt containing at least about 0.5, and preferably no more than 5.0, parts per million (ppm) of chromium III ion by weight.

2. The process for the addition of chromium III salt to sucrose, during its refining in any variation of the modern sugar refinery, which comprises the consecutive steps of adding the appropriate amount of chromium III salt to the approximately "60% solids" syrup issuing from the multiple-effect evaporators, processing this syrup through the vacuum pan boilers, the crystallizers, and finally the centrifuges so that the final sugar (known as "raw sugar") contains chromium III as specified in item 1 above.

3. The process for the addition of chromium III to refined sugar which comprises the steps of adding an appropriate amount of a chromium III salt to the char-filtered liquor which is fed into vacuum pans, reduced in volume by vacuum evaporation until a massecuite of sufficient crystalline sucrose content is produced to be led off into the centrifuges, either directly or through crystallizers, thence to the drying granulators, to produce a final refined sugar contining chromium III as specified in item 1 above.

4. The process which comprises the addition of chromium III salt during the grinding process used in production of "milled sugar" as with a hammermill, ball mill, or attrition mill, to produce a powdered or milled form of sucrose as specified in item 1 above.

5. A physical mixture of pure D-glucose and a pharmacologically acceptable salt of chromium III containing at least about 0.5, and preferably no more than 5.0, parts per million of chromium III ion by weight.

6. The process which comprises of the steps of milling together pure D-glucose and a chromium III salt to produce the physical mixture of item 5 above.

7. The process which comprises crystallization of pure D-glucose from a concentrated aqueous solution which contains a chromium III salt in an amount appropriate to produce the physical mixture of item 5 above.

8. The process which comprises mixing a sterile chromium III salt with a sterile, aqueous solution of pure glucose for intravenous injection to produce a solution in which the ratio of chromium III ion to glucose is approximately 0.5/1,000,000 to 5.0/1,000,000, by weight.

Known, appropriate, nontoxic pharmaceutically acceptable salts of Cr III include, but are not limited to, the following:

Chromium chloride hexahydrate, $CrCl_3 \cdot 6H_2O$
Chrome alum, $CrK(SO_4)_2 \cdot 12H_2O$
Hexaurea chromium chloride, $CrCl_3 \cdot (H_2NCONH_2)_6$
Chromium sulfate, $Cr_2(SO_4)_3$
Chromium acetate hydrate, $Cr(O_2C_2H_3)_3 \cdot nH_2O$
Chromium lactate hydrate, $Cr(O_2CCHOHCH_3)_3 \cdot nH_2O$

DESCRIPTION OF THE PREFERRED EMBODIMENTS

EXAMPLE 1

Preparation of a $CrCl_3 \cdot 6H_2O$ - sucrose mixture containing 0.500 ppm of Cr III.

a. Preparation of concentrate. Combine 256 mg. of $CrCl_3 \cdot 6H_2O$ with 99.744 g. of refined sucrose and thoroughly grind together, as with a blender, ball mill or hammer mill, to produce a uniform mixture. The resulting mixture contains 2,560 mg. of $CrCl_3 \cdot 6H_2O$ per kilogram and has a chromium III ion concentration of 500 ppm.

b. Dilution. Combine 1,000 g. of the concentrate prepared in part (a) with 999.0 g. of refined sucrose and thoroughly mix, as in a rotary tumbler, so as to uniformly mix the sucrose granules with the powdered sugar mixture prepared in part (a). The resulting mixture has a chromium III ion concentration of 0.500 ppm.

EXAMPLE 2

In analogous fashion, concentrates similar to that of part (a) are prepared from other chromium salts using the amounts listed in the following table:

| Salt | Cr III Content*, % | mg. for Preparation of Concentrate |
|---|---|---|
| $Cr(C_2H_3O_2)_3 \cdot nH_2O$ | 23.5 | 213 mg. |
| $Cr_2(SO_4)_3 \cdot nH_2O$ | 20.1 | 249 mg. |
| $CrK(SO_4)_2 \cdot 12H_2O$ | 10.41 | 480.3 mg. |

| Salt | Cr III Content*, % | mg. for Preparation of Concentrate |
|---|---|---|
| $CrCl_3 \cdot 6H_2NCONH_2$ | 10.03 | 498.5 mg. |
| $Cr_2(SO_4)_3 \cdot 4H_2NC(NH)NHC(NH)NH_2$ | 13.06 | 382.8 mg. |
| $CrCl_3 \cdot 3H_2NC(NH)NHC(NH)NH_2$ | 11.26 | 444.0 mg. |
| $Cr(C_6H_4(CO_2^-)(OH))_3$ | 11.22 | 445.6 mg. |

* Of representative, pure, reagent-grade chromium salts.

In each case, admixture of 1.000 g. of the concentrate with 999.0 g. of refined sucrose as in Example 1b produces refined sucrose having a chromium III ion content of 0.500 ppm.

EXAMPLE 3

Refined sucrose having a chromium III ion concentration of 5.00 ppm is produced by following each procedure in Examples 1 and 2 except that 10.00 g. of concentrate are mixed with 990.0 g. of refined sucrose.

Intermediate chromium III ion concentrations are produced by the use of corresponding, proportional amounts of concentrate to give refined sucrose having concentrations of chromium III ion such as 0.8, 1.0, 1.5, 2.0, 2.5, 3.0, 3.5, 4.0 and 4.5 ppm.

BIBLIOGRAPHY

1. H. A. Schroeder, A. P. Nason and I. H. Tipton, "Chromium Deficiency as a Factor in Atherosclerosis," J. Chron. Dis. 1970, 23, 123–142.
2. W. Mertz, "Chromium Occurence and Function in Biological Systems," Physiol, Rev. 49, 165–239 (1969).
3. W. Mertz, "Biological Role of Chromium," Fedn. Proc. 26, 186–193 (1967).
4. K. Schwartz and W. Mertz, "Chromium (III) and the Glucose Tolerance Factor, "Arch. Biochem. 85. 292–295 (1959).
5. I. W. F. Davidson and W. L. Blackwell, "Changes in Carbohydrate Metabolism of Squirrel Monkeys with Chromium Dietary Supplementation," Proc. Soc. Exp. Biol. Med. 127, 66–72 (1968).
6. H. A. Schroeder, "Chromium Deficiency in Rats: A Syndrome Simulating Diabetes Mellitus with Retarded Growth," J. Nutr. 94, 439–445 (1965).
7. H. A. Schroeder, "Serum Cholesterol Levels in Rats Fed Thirteen Trace Elements,": ibid. 94, 475–480 (1965).
8. H. A. Schroeder and J. J. Balassa, "Influence of Chromium, Cadmium, and Lead on Rat Aortic Lipids and Circulating Cholesterol." Am. J. Physiol. 209, 433–437 (1965).
9. H. A. Schroeder, "Serum Cholesterol and Glucose Levels in Rats Fed Refined and Less Refined Sugars and Chromium," J. Nutr. 97, 237–242 (1969).
10. Merck Index, 8th Ed., Merck and Co., Rahway, N.J., 1968, p. 993.
11. A. White, P. Handler, E. L. Smith and D. Stetten, Jr., "Principles of Biochemistry," 2nd Ed., McGraw-Hill Book Co., N.Y., 1959, pp. 381–383.
12. R. W. Stout, "Insulin-Stimulated Lipogenesis in Actual Tissues in Relation to Diabetes and Atheroma," Lancet 1968, 702–703.
13. E. Sowton, "Cardiac Infarction and the Glucose Tolerance Test," Brit. Med. J. 1, 84–85 (1962).
14. A. M. Cohen and F. Shafrin, "Carbohydrate Metabolism in Myocardial Infarction," Diabetes 14, 84–87 (1965).
15. F. H. Epstein, "Hyperglycemia. A Risk Factor in Coronary Heart Disease," Circulation 36, 609–619 (1967).
16. R. A. Levine, D. H. P. Streeten and R. J. Doisy, "Effects of Oral Chromium Supplementation on the Abnormal Glucose Tolerance of Elderly Human Subjects," Metabolism 17(2), 114–125 (1968).
17. H A. Schroeder, "The Role of Chromium in Mammalian Nutrition," Am. J. Clin. Nutr. 21(3), 230–244 (1968).
18. W. G. Glinsmann, F. J. Feldman and W. Mertz, "Plasma Chromium After Glucose Administration," Science 152, 1243–1245 (1966).
19. R. J. Doisy, D. H. P. Streeten, M. L. Souma, M. E. Kalafer, S. I. Rekant, and T. G. Dalakos, "Metabolism of [51] Chromium in Human Subjects—Normal, Elderly, and Diabetic Subjects," in *Newer Trace Elements in Nutrition*, ed. W. Mertz and S. E. Cornatzer, Marcel Dekker, Inc., N.Y., 1971, pp. 155–167.

I claim:

1. In a method of preparing a highly refined sucrose composition having the property of reducing the severity or incidence of atherosclerosis or adult onset diabetes consisting essentially of a mixture of sucrose and a pharmaceutically acceptable salt of a chromium III ion, the steps comprising:
   A. mixing a higly refined sucrose in powdered form with a pharmaceutically acceptable salt of a chromium III ion, said salt being incorporated in said mixture in an amount sufficient to provide a concentration of said salt of 500 ppm per gram, basis the weight of said sucrose,
   B. grindng said mixture unitl a uniform mixture of said highly refined sucrose and said salt of a chromium III ion is produced to provide a concentrate,
   C. adding said concentrate to a powdered highly refined sucrose to form a mixture thereof, said concentrate being added in an amount sufficient to provide a concentration of said salt of a chromium III ion in said last named mixture in the range of from 0.5 to 5.0 ppm per gram, basis the total weight of said highly refined sucrose in said composition.

2. The method of claim 1 in which the chromium III salt is chromium chloride hexahydrate.

3. The method of claim 1 in which the chromium III salt is chrome alum.

4. The method of claim 1 in which the chromium III salt is a hexaurea chromium chloride.

5. The method of claim 1 in which the chromium III salt is chromium sulfate.

6. The method of claim 1 in which the chromium III salt is hydrated chromium acetate.

7. The method of claim 1 in which the chromium III salt is hydrated chromium lactate.

* * * * *